United States Patent
Blendermann et al.

(10) Patent No.: US 6,289,425 B1
(45) Date of Patent: Sep. 11, 2001

(54) METHOD FOR VERIFYING AVAILABILITY OF DATA SPACE IN VIRTUAL TAPE SYSTEM

(75) Inventors: Stephen H. Blendermann; Alan Ray Sutton, both of Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/108,888

(22) Filed: Jul. 1, 1998

(51) Int. Cl.[7] .................................................. G06F 12/00
(52) U.S. Cl. ............................. 711/170; 711/4; 700/214
(58) Field of Search .................................. 711/170, 118, 711/4; 369/30, 34, 36; 700/214

(56) References Cited

U.S. PATENT DOCUMENTS 4,467,421 * 8/1984 White ...................................... 711/118
5,455,926 * 10/1995 Keele et al. ............................. 711/4
5,805,864 * 9/1998 Carlson et al. ................. 395/500.45

* cited by examiner

Primary Examiner—Do Hyun Yoo
Assistant Examiner—Nasser Moazzami
(74) Attorney, Agent, or Firm—Brooks & Kushman P.C.

(57) ABSTRACT

A method for verifying availability of reusable data space on a selected virtual scratch tape in a virtual tape system utilizes volume label information routinely maintained in an external tape inventory management arrangement to generate labels separate from the actual volume labels stored on a corresponding tape. The volume labels are generated in a format compatible for input to an external tape management system after the selected virtual scratch tape has been mounted on a virtual tape drive. The "on-the-fly" generation of the separate volume labels based on preexisting label information allows the present invention to significantly reduce processing time and needless data transfers typically required to verify whether a scratch tape can in fact be reused, thereby increasing overall efficiency in data storage management and storage space utilization.

7 Claims, 1 Drawing Sheet

METHOD FOR VERIFYING AVAILABILITY OF DATA SPACE IN VIRTUAL TAPE SYSTEM

TECHNICAL FIELD

The present invention relates generally to a virtual tape data storage arrangement, and more particularly to an improved method for verifying whether data space on a scratch tape is reusable which increases efficiency by minimizing the movement of data.

BACKGROUND ART

Generally, automated cartridge systems (ACS) provide a mechanism by which multiple users in a data processing system can have common access to multiple data storage subsystems such as magnetic tape cartridge devices. In conventional tape systems, data files generated by remote user computer systems for storage on a particular tape cartridge include a predetermined expiration date which is used as a control mechanism by which a tape management subsystem can determine whether a particular space on a tape can be rewritten with new data. However, in conventional tape systems, expired data from a "scratched" tape volume is not actually deleted from the tape until a user actually writes new data to the tape, thereby significantly decreasing the efficiency in reutilizing data storage space.

In response, a virtual tape system has been developed which significantly improves storage space utilization and control by incorporating the advantages of an intermediate disk buffer as part of a tape emulation arrangement. Such an arrangement is taught in commonly owned copending U.S. patent application Ser. No. 09/110,217 (attorney docket number 97046TAP/STK97046PUS), filed on Jul. 6, 1998, and incorporated herein by reference.

More specifically, in the referenced virtual tape system, a disk buffer is connected between remote users and the tape storage devices and arranged to appear to users as though it were a physical tape device. All data volumes are initially stored in the disk buffer, and subsequently written to a physical tape device using predetermined protocols which limit the occurrence of unusable dead spaces on the tapes while also improving the ability to reclaim any fragmented space which does occur.

However, before a particular tape volume can actually be reused, a tape management subsystem will request mounting of a scratch tape to a tape drive, i.e., a scratch tape is a tape which no longer contains any unexpired data, and examine all volume label and header label information stored on the tape to verify whether the corresponding data stored on the tape has expired and can be overwritten by the system.

The problem with such an arrangement derives from the fact that to analyze the volume and header information, the entire virtual volume must be recalled into the disk buffer from the tape to make the label information available to the tape management subsystem. This in turn produces substantial processing delays and a decrease in overall system efficiency due to the required movement of data simply to verify that the data can be overwritten if expired.

One known arrangement has attempted to overcome this problem by creating a duplicate file of volume labels and headers when the volumes are originally stored on a tape, and maintaining the duplicate volume labels and headers in a resident memory in the interim buffer of the virtual tape system. However, such an arrangement is not fully satisfactory because of the substantial added cost and complexity of constantly maintaining all label information in the resident memory. As a result, a need exists for an improved method of verifying the availability of reusable data space on a scratch tape in a virtual tape system which minimizes both data movement and additional cost and complexity to the virtual tape system.

DISCLOSURE OF THE INVENTION

It is therefore an object of the present invention to provide an improved method for verifying availability of reusable data space on a scratch tape in a virtual tape system which improves data space reutilization efficiency.

It is another object of the present invention to provide a method for verifying availability of reusable data space on a scratch tape in a virtual tape system which minimizes the need for data movement between the tape and a disk buffer.

It is a further object of the present invention to provide a method for verifying availability of reusable data space on a scratch virtual volume in a virtual tape system which does not require physical mounting of a tape to a physical tape drive mechanism.

In accordance with these and other objects, the present invention provides a method for verifying availability of reusable data space on a selected scratch tape in a virtual tape system which utilizes volume label information routinely maintained in an external tape inventory management arrangement to generate a separate file of labels in a compatible format for input to a tape management subsystem in communication with the virtual tape system after the selected virtual tape has been retrieved from an interim buffer in the virtual tape system, i.e., "mounted" on a virtual tape drive.

In accordance with one aspect of the present invention, the method comprises receiving a request for mounting a scratch tape, selecting a scratch tape for mounting on the virtual drive, and generating a tape volume label comprising information of a corresponding virtual volume stored on the selected scratch tape. The generated tape volume label is generated in a format compatible for use by an external tape management system based on preexisting file meta data maintained external to the virtual tape system and the selected tape. The generated tape volume label is then input into the external tape management system for determining whether any unexpired data is stored on the selected tape. The scratch tape is reused for storing new virtual volumes if there is no unexpired data on the virtual tape. Otherwise, the generated tape volume label is destroyed and the file meta data for the virtual volume is updated to indicate that unexpired data is present on the selected tape. The preexisting information maintained external to the virtual tape control system is originally derived from actual meta data information included with volume files stored on the tape.

With such an arrangement, the present invention can allow a tape management system in the virtual tape system to verify whether a selected scratch tape contains only expired data which can be written over without copying the entire virtual volume data from the physical tape into a disk buffer, and without requiring physical mounting of an actual tape to a physical tape drive. This significantly reduces processing time and needless data transfers, thereby increasing overall efficiency in data storage management and storage space utilization.

These and other objects, features, and advantages of the present invention will be readily apparent from the following detailed description of the best mode for carrying out the invention when taken in connection with the accompanying drawings.

BEST MODE FOR CARRYING OUT THE INVENTION

Figure 1:
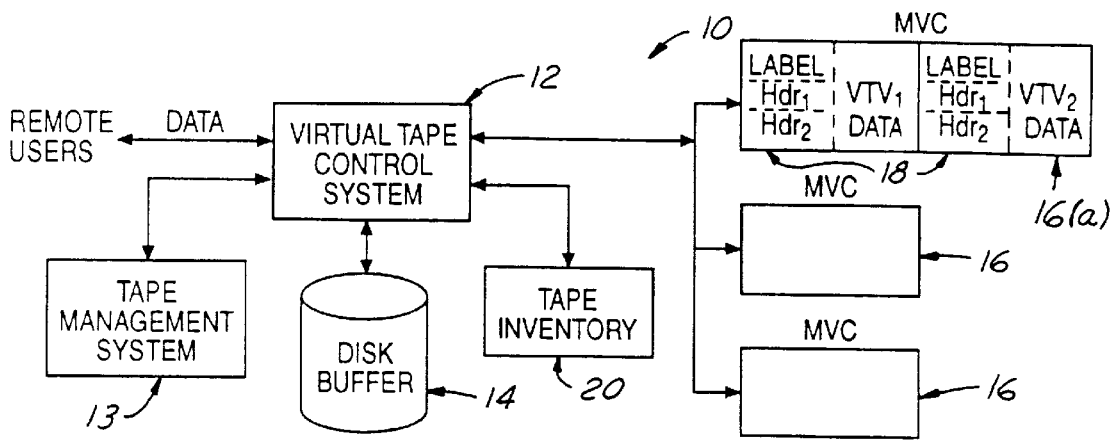
FIG. 1 is a block diagram illustrating a virtual tape system in accordance with the present invention.

The overall method of the present invention will now be described in connection with FIGS. 1 and 2. More specifically, a virtual tape system 10 includes a virtual tape control system (VTCS) 12 having a suitable control processor (not shown) for routing all data volume files received from remote users to a disk buffer 14. VTCS 12 is arranged to transfer or migrate data from disk buffer 14 to one or more multiple volume cartridges (MVC) 16 as virtual tape volumes (VTV). As illustrated in FIG. 1, each volume includes a corresponding volume label and header 18 which provides predetermined information such as volume identifying data and expiration date.

A map matching the MVC location with corresponding VTV names is maintained by VTCS 12. An external tape management system (TMS) 13 also provides overall management of the use of virtual tapes used by virtual tape system 10. In addition, at least some of the volume label and header information is manually recorded in an external tape inventory management arrangement 20. As is well understood to one of ordinary skill in the art, external inventory management arrangement 20 is routinely maintained as an administrative mechanism which allows system technicians to identify particular tapes, and to select potential reusable scratch tapes when a scratch tape is requested by a user via VTCS 12.

When VTCS 12 emulates a request for mounting of a scratch tape such as VTV 16(a) to a tape drive by requesting retrieval of the scratch virtual volume from interim buffer 14, the TMS 13 must verify that there is no unexpired or valid data still present on the tape before any new data will be written over the data previously stored on the tape.

In accordance with the present invention, when the virtual scratch tape is mounted to the virtual tape drive, volume labels and headers are generated in a format suitable for use by the TMS 13 using the information available in the external inventory management arrangement 20. The new volume labels and headers are generated to provide enough information to allow the TMS 13 to determine whether all files on the scratch tape are expired or invalid. In other words, when a request for a scratch tape is generated, a virtual scratch tape is preliminarily selected, but will not be reused until TMS 13 actually verifies that the virtual tape is scratch based upon the generated volume labels and headers.

If TMS 13 determines that valid data is still present on the selected tape, the generated labels are immediately destroyed and the meta data for the actual virtual volume is updated to indicate that unexpired data is still present and is to not be overwritten.

Figure 2:
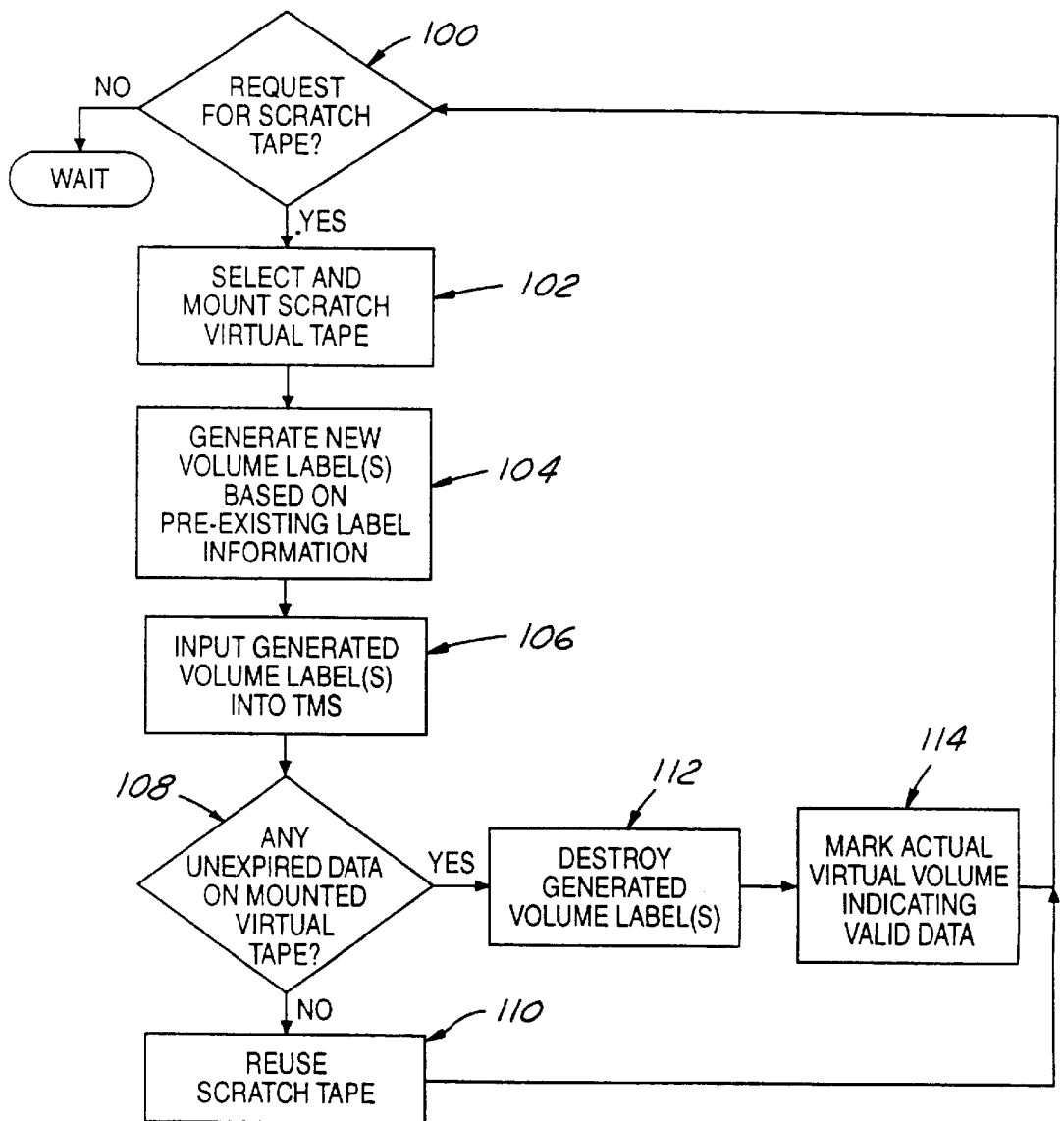
FIG. 2 is a flowchart showing the overall process of the present invention.

This process is summarized in the flow chart of FIG. 2. As denoted at block 100, if a request is received from the VTCS for a scratch tape, a virtual tape is selected and mounted to a virtual drive system at block 102. At block 104, a new file of volume labels and headers are generated in a suitable TMS usable format based on information provided from the external tape inventory management source. After mounting of the tape, the generated volume labels and headers are input into the TMS for analysis at block 106.

As denoted at decisional block 108, the TMS uses the input volume labels and headers to verify whether there is any unexpired data stored on the mounted virtual tape. If not, the data space on the scratch tape can then be reused at block 110 by writing any new data over the data on the tape. Otherwise, at block 112 the input volume labels and headers are destroyed and the meta data for the actual virtual volume stored on the tape is updated to indicate the existence of unexpired data. A new virtual scratch tape is then requested at block 114.

Thus, the present invention advantageously provides a method for verifying the availability of reusable data space on a scratch tape in a virtual tape system which does not require the VTCS to transfer any data from the physical tape into the system disk buffer. The "on-the-fly" creation of TMS compatible volume labels and headers from information already maintained external to the VTCS when a virtual scratch tape is requested and mounted allows the present invention to significantly increase overall efficiency in data space utilization and management.

While the best mode for carrying out the invention has been described in detail, those familiar with the art to which this invention relates will recognize various alternative designs and embodiments for practicing the invention as defined by the following claims.

What is claimed is:

1. A method for verifying availability of reusable data space on a selected scratch tape in a virtual tape system, said virtual tape system having a tape control system for controlling the reading and writing of virtual volumes to at least one tape drive device, said method comprising:

receiving a request for mounting a scratch tape;

selecting a virtual scratch tape for mounting;

generating a tape volume label corresponding to the selected virtual scratch tape, said generated tape volume label being generated in a format compatible for use by an external tape management system based on preexisting information maintained external to the virtual tape system and the selected virtual scratch tape;

inputting the generated tape volume label into the tape external management system;

determining whether any unexpired data is stored on the mounted scratch tape based on the information in the input tape volume label; and reusing the virtual scratch tape for storing new virtual volumes if there is no unexpired data on the mounted scratch tape.

2. The method of claim 1 further comprising: destroying the generated tape volume label and updating meta data for the virtual volumes on the selected virtual scratch tape as containing unexpired data, if the inputted tape volume label indicates that the mounted scratch tape contains unexpired data.

3. The method of claim 1 wherein the preexisting information comprises information derived from meta data of actual files stored in the virtual volumes on the selected scratch tape.

4. A method for verifying availability of reusable data space on a selected scratch tape in a virtual tape system, said virtual tape system having a tape control system for controlling the reading and writing of virtual volumes to at least one tape drive device, said method comprising:

receiving a request for mounting a scratch tape;

preliminarily selecting a virtual scratch tape and mounting the selected virtual scratch tape; and verifying that the mounted scratch tape does not have any unexpired data stored thereon without copying an entire virtual volume data from a physical tape into the virtual tape system, the verifying step comprising:

generating a tape volume label corresponding to the selected virtual scratch tape based on preexisting information maintained external to the virtual tape system; and determining whether any unexpired data is stored on the scratch mounted tape based on the information in the tape volume label.

5. The method of claim 4 wherein the virtual scratch tape is only used for storing new virtual volumes if there is no unexpired data on the mounted scratch tape.

6. The method of claim 4 further comprising: destroying the generated tape volume label and updating meta data for the virtual volumes on the selected virtual scratch tape as containing unexpired data, if the tape volume label indicates that the mounted scratch tape contains unexpired data.

7. The method of claim 4 wherein the preexisting information comprises information derived from meta data of actual files stored in the virtual volumes on the selected scratch tape.

* * * * *